United States Patent [19]

Mindich

[11] Patent Number: 4,823,941
[45] Date of Patent: Apr. 25, 1989

[54] HIGH SPEED TUBULAR BELT CONVEYOR AND SYSTEM AND METHOD FOR MAKING

[76] Inventor: Alex Mindich, 8339 N. Christiana, Skokie, Ill. 60076

[21] Appl. No.: 799,928

[22] Filed: Nov. 20, 1985

[51] Int. Cl.⁴ ............................................. B65G 15/08
[52] U.S. Cl. ................................. 198/819; 198/821; 198/831; 198/835; 198/843
[58] Field of Search ............... 198/819, 541, 547, 532, 198/821, 835, 831, 843, 847, 535, 531, 534; 193/3, 15, 32

[56] References Cited

U.S. PATENT DOCUMENTS

| | | | |
|---|---|---|---|
| 575,550 | 1/1897 | Mathews | 193/32 |
| 784,463 | 3/1905 | Yancey | 198/540 X |
| 789,135 | 5/1905 | Baggaley | 198/532 X |
| 1,427,553 | 8/1922 | Schwinger | 198/819 X |
| 2,108,488 | 2/1938 | Johns | 198/819 X |
| 2,109,861 | 3/1938 | Johns | 198/819 X |
| 2,212,024 | 8/1940 | Johns | 198/819 |
| 2,233,652 | 3/1941 | Ticknor et al. | 198/541 X |
| 2,244,845 | 6/1941 | Matthews | 198/821 |
| 2,548,111 | 4/1951 | Johns et al. | 198/819 X |
| 2,852,126 | 9/1958 | Ohlberg | 198/821 X |
| 3,318,287 | 5/1967 | Buschbom | 198/540 X |
| 3,429,422 | 2/1969 | Yoshimura | 198/819 X |
| 3,576,262 | 4/1971 | Konchesky | 193/3 |
| 3,595,378 | 7/1971 | Kamisaka | 198/688 X |
| 3,661,244 | 5/1972 | Koyama | 198/854 |
| 3,762,536 | 10/1973 | Rogers | 198/819 X |
| 3,773,167 | 11/1973 | McGinnis | 198/835 |
| 4,402,395 | 9/1983 | Hashimoto | 198/819 X |
| 4,410,082 | 10/1983 | McGinnis | 198/819 X |

FOREIGN PATENT DOCUMENTS

| | | | |
|---|---|---|---|
| 720429 | 5/1942 | Fed. Rep. of Germany | 193/32 |
| 931364 | 8/1955 | Fed. Rep. of Germany | 198/541 |
| 2263955 | 10/1975 | France | 198/819 |
| 583805 | 10/1958 | Italy | 193/32 |
| 52-25383 | 2/1977 | Japan | 198/819 |
| 56-48312 | 5/1981 | Japan | 198/819 |
| 610752 | 6/1978 | U.S.S.R. | 198/531 |

*Primary Examiner*—Robert J. Spar
*Assistant Examiner*—D. Glenn Dayoan
*Attorney, Agent, or Firm*—Flehr, Hohbach, Test, Albritton & Herbert

[57] ABSTRACT

A high speed, normally closed tubular belt conveyor system operable over long distances and through relatively short radius horizontal and vertical turns. The belt conveyor is prestressed at fabrication to provide a normally closed tubular configuration. Profiled end pulleys are provided which open the belt for loading and unloading with minimum strain and distortion. A distributive drive system provides reduced longitudinal tensile stresses in the belt and facilitates high speed operation. A feeder-accelerator system loads granular-type material into the tubular belt at a rate and velocity which are conformed to the capacity and velocity of the belt.

13 Claims, 6 Drawing Sheets

HIGH SPEED TUBULAR BELT CONVEYOR AND SYSTEM AND METHOD FOR MAKING

BACKGROUND OF THE INVENTION

The present invention relates to tubular belt conveyors and, in particular, to a prestressed, self-closing tubular conveyor belt and to the components and to the overall construction of a high speed conveyor system which uses such a tubular belt.

In general, the term tubular belt or tubular conveyor belt refers to a belt which typically has a relatively narrow width compared to its length and which is rolled or formed along its width into a closed tube with overlapping longitudinal edges. Preferably, when used in material transporting systems, such tubular belts are formed as endless conveyors in which pourable material is loaded at one point and dispensed at a second point.

For a number of reasons, conventional tubular conveyor belts have not fulfilled their potential for use in material transport. First, conventional tubular belts require cumbersome external guides, such as radially arranged rollers or funnels or stiff outer tubes, to form and maintain their tubular configuration and to keep the belt edges closed. In addition, these tubular belt conveyors are subject to twisting, despite the use of external shaping devices. If the joint formed by the overlapped belt edges is twisted from the preferred vertical position to a downward-facing position on the lower half of the tube, the belt edges may separate, allowing spillage of the bulk material carried by the conveyor.

Conventional tubular belt conveyor systems use a lumped drive system comprising a cylindrical drive pulley at one end of the conveyor belt, a second cylindrical stretching pulley at the opposite end of the belt, and a set of supporting pulleys or other supports along the lines of the system. This construction has many of the known disadvantages of flat belt conveyor systems. That is, the use of the single, lumped drive to pull the entire conveyor line results in extremely high longitudinal tensions in the belt, especially on ascending slopes. The maximum conveyor length is limited by the tensile strength of the conveyor belt. The high tensile stresses in the belt require heavy reinforcement, and any attempt to lengthen the conveying lines requires even greater, heavier and typically more rigid and expensive reinforcement. In addition, the high torque capacities required of lumped drive systems to pull such heavy and perhaps heavily reinforced conveyor lines usually requires the installation of a speed reduction transmission, which results in additional energy losses.

Furthermore, high speed loading and unloading of a normally closed high speed tubular belt conveyor is difficult. The normally closed belt must be opened and closed for both loading and unloading. In addition, efficiency in the conveying process requires high conveyor belt speeds and requires that the material be loaded through the opening onto the fast moving conveyor belt, transported by the belt, and off-loaded, all without spillage of material.

In short, the construction of conventional tubular belt conveyor systems limits their speed and length, limits the number and degree of turns in such systems, and makes difficult high speed efficient loading of such systems.

SUMMARY OF THE INVENTION

In view of the above discussion, it is one object of the present invention to provide a high speed tubular belt conveyor system which is capable of operating at high speeds over long, essentially unlimited distances, and, where necessary, using a multiplicity of conveying line turns.

It is another object of the present invention to provide a tubular belt construction which is constructed with prestress to inherently provide a closed tubular configuration without the use of external locating devices.

It is also an object of the present invention to provide a distributed drive system for a tubular belt conveyor in order to reduce the tensile stresses in the belt and to reduce the drive capacity requirements and to thereby permit the conveyor system to be formed to essentially any length.

It is an associated object of the present invention to provide a tubular belt conveyor construction and a drive and support system construction which permit incorporating a multiplicity of horizontal and vertical turns as well as extended length and high speed capabilities into such conveyor system.

It is an additional object of the present invention to provide a system for efficiently loading a high speed tubular belt conveyor, with the loading rate and velocity of the fed material corresponding to the capacity and velocity of the moving conveyor belt.

It is still another object of the present invention to provide load and unload pulleys for a high speed tubular belt conveyor system which open the normally closed belt with a minimum of strain and distortion.

The above and other objects of the present invention are achieved in a conveyor belt which is prestressed along its transverse width to provide an openable, closed tubular configuration. In one aspect, the belt comprises elastic inner and outer layers which are joined together so that the inner layer is in tension along its width and the outer layer is in compression along its width, with the result that internal bending moments maintain the belt in a normally closed tubular configuration. In one embodiment the desired combination of compression and tension is provided using electric inner and outer layers having unstressed widths which are, respectively, less than and greater than the nominal belt width.

In an alternative embodiment, the belt includes an array of circumferential spring bands whose inherent spring action normally bend the belt to a substantially tubular configuration and through an angle equal to or greater than 360°.

In still another aspect, the belt includes means for reinforcing the stiffness thereof along a selected diameter. The reinforcing means comprises a pair of relatively thick, longitudinally extending belt sections at said diameter and may include longitudinally extending reinforcing bands. This construction imparts stiffness to the belt along the given diameter and provides structural integrity for maintaining the normally closed tubular configuration, yet permits relatively easy bending (turning) of the belt in directions generally transverse to the diameter. Such thick sections may also be used to maintain the alignment of the belt relative to a guide or to a drive roller.

In another aspect, the present invention relates to a drive roller means for driving the adjacent branches (loaded and empty) of a tubular conveyor belt, comprising a drive roller mounted between the loaded and empty branches for rotatably engaging and driving the branch; and at least one idler roller which is supported at the opposite side of the loaded conveyor branch from the drive roller for maintaining engagement of the drive roller with the loaded branch. Alternatively, idler rollers may be mounted at the outside of both the loaded and empty branches for maintaining the drive roller in engagement with both the loaded branch and the empty branch of the tubular belt. In a preferred embodiment, a number of such drive rollers are used to define and drive the conveyor belt through vertical turns.

In still another aspect, the invention relates to a conveyor pulley for opening a normally closed tubular belt conveyor. The ratio $r/R$ of the edge radius to the center radius of the pulley is selected to substantially equalize the paths traversed by the edge and center regions of the belt around the pulley and thereby substantially decrease the stress differential in the edge and center regions of the pulley. In another aspect, the pulley comprises a plurality of independent rotating sections mounted on a common axis for adapting the angular velocity of the pulley sections to the tangential velocities of the associated belt sections to thereby substantially decrease differences in longitudinal tension across the width of the belt.

In another aspect, the present invention relates to a bunker for dispensing granular-type material onto a moving conveyor belt at a dispensing flow rate and velocity that are conformed to the capacity and velocity of the conveyor belt. The bunker comprises frame means; an upper bunker mounted to the frame for holding a quantity of the material and having an opening in the bottom for dispensing the material; closure means for varying the size of the opening to conform the dispensing flow rate to the capacity of the moving conveyor; a plurality of funnels supported by the frame between the bunker and the conveyor in alignment with the path of the dispensed material; means for varying the vertical position of the funnels so that the funnels cooperatively conform the cross-section of the material flow to that of the conveyor; and a lower funnel aligned with the moving conveyor for conforming the direction of the material flow to the direction of the conveyor movement.

Additional objects and features of the invention will be evident from the following description taken in conjunction with the accompanying drawings.

DETAILED DESCRIPTION OF THE INVENTION

Overview

Figure 1:
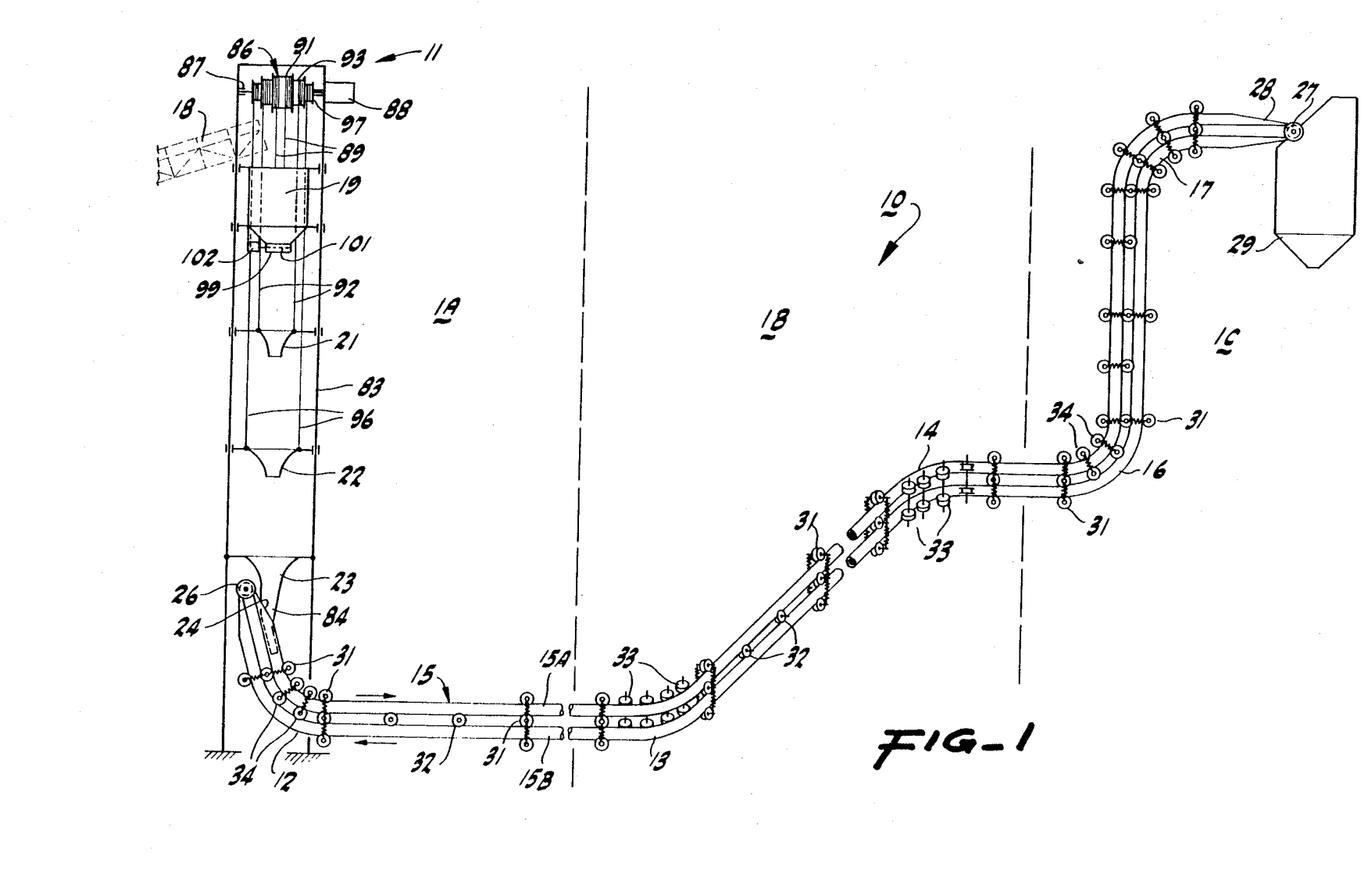
FIG. 1 is a schematized overview of one embodiment of the high speed tubular belt conveyor system of the present invention.

FIG. 1 is an overview of a high speed endless tubular belt conveyor system 10 that is constructed in accordance with the objects and principles of the present invention. FIG. 1 is divided into three parts. Section 1A is a side elevation view showing the loading end of the conveyor system 10, the associated feeder-accelerator tower 11, and the relatively small radius, vertical belt turn 12 that is used to position the belt for loading. Section 1B is a perspective view of an intermediate section of the tubular conveyor belt system 10 which illustrates the manner of implementing horizontal turns such as 13 and 14. Section 1C is also a side elevation view, in this case of the opposite, unloading end of the tubular belt conveyor system 10. Section 1C illustrates vertical turns 16 and 17 that are used to position the belt for unloading.

As shown in Section 1A of FIG. 1, a transporter 18, which typically is not part of the the present invention, can be used to load granular-type material into a bunker 19 of the feeder-accelerator tower 11. Alternatively, the output or unloading end of one conveyor system 10 can be used to load the bunker 19 of a second conveyor system 10. A steady stream of the material is dispensed from the bunder 19 (see FIG. 13) and falls down the feeder tower 11 through a series of movable funnels such as 21 and 22 and then via a fixed funnel 23 into an opening 24 which is formed in the normally closed tubular belt 15 by the tension applied by end pulley 26. The movable bunker 19, movable funnels 21 and 22 and fixed funnel 23 cooperatively match the rate (volume/time) and velocity (speed and direction) of the material flow to those of the moving belt 15. At pulley 26, the belt 15 is unwound or opened by tensile forces, and then is wound back into its normally closed tubular configuration by its internal prestress forces for the purpose of carrying the material to the unloading station, shown in Section 1C of FIG. 1. There the belt is unwound or opened by the tensile forces applied by a similar end pulley 27 to unload the material into the destination bunker 29.

The tubular belt 15 comprises the loaded branch 15A, which carries material from the loading point at pulley 26 to the unloading point at pulley 27, and an empty branch 15B, which preferably is adjacent and parallel to the load branch 15A. Alternatively, both branches 15A and 15B can be load-carrying.

FIG. 1 also illustrates various structures which can be used for driving, supporting and turning the tubular belt 15. The loaded and empty branches 15A and 15B are driven in opposite directions by drive rollers 31 which are spaced along the conveyor lines and are constructed as described below for driving both branches of the line in opposite directions. The distances between the drive rollers 31 may vary with varying vertical slopes of the conveyor line. Conventional support rollers 32 are used to support the loaded branch 15A at intermediate points between the drive rollers 31. In a preferred arrangement, horizontal turns such as those shown at 13 and 14 are defined by entrance and exit drive rollers 31 and by a number of intermediate horizontal guide rollers 33 which may be constructed similar to or identical to the vertically oriented support rollers 31. The number of guide rollers 33 per turn depends upon the radius of the turn and the size (and weight) of the conveyor lines.

Two interchangeable vertical turn constructions are shown. The first type is illustrated at load turn 12 and vertical turn 16. This type of vertical turn uses a pair of spaced outer drive rollers 31 (which drive both branches 15A and 15B) and one or more intermediate drive rollers 34 (for driving the loaded branch 15A only). The second vertical turn construction, shown at unload turn 17, uses only drive rollers 31 (for both branches). The various drive rollers 31 and 34 and support and guide rollers 32 and 33 are mounted either on conveyor frames or girders or to a structural framework of a building or to other suitable support structures. This supporting framework is not part of the invention and is not shown in FIG. 1.

The system 10 of FIG. 1 illustrates the situation in which material is loaded from the feeder-accelerator tower 11 onto the loaded branch 15A of the tubular belt at a steeply inclined downward slope, levels out to a generally horizontal path which is routed in different directions by turns 13 and 14, then is routed through turn 16 into a vertical ascent and turned at 17 for unloading by end pulley 27. More generally, the depicted features enable the conveyor line to be turned easily in any direction needed, including vertical and horizontal directions, so that material can be loaded and transported over steep up and down slopes and around various obstacles, to the unloading point 27. All conveyor line turns have drive rollers 31 for both branches at the end points of the turn radius. The actual number of drive rollers 31 and 34 (at turns and along straight sections), and the distances between drive rollers are functions of the desired conveying speed, material density, tube diameter, belt thickness and strength, internal belt prestress forces and the nominal inclinations and turn radii of the conveying line. Drive rollers are stationed at the loading and unloading points. Typically, vertical or steeply sloped sections (Section 1C) use relatively closely spaced drive rollers without support rollers 32. In conforming the loading rate and direction of the loaded material to the conveyor belt 15, the feeder-accelerator tower 11 enables efficient high speed operation of the tubular conveyor system 10.

Tubular Belt 15 and Methods of Construction

The tubular belt 15, alternative embodiments of the belt and methods of constructing the various embodiments are depicted in FIGS. 2 through 9. As mentioned, a primary advantage of the belt 15 and its described alternative embodiments is the inherent ability to maintain a tubular configuration. This configuration results from stresses that are incorporated into the belt during its fabrication. The prestressed forces are developed by using a multi-layer belt construction of two or more layers in which the layers are prestressed then joined together as by gluing or welding, or by reinforcing the belt with a prestressed flexible spring-like carcass, or by a combination of these two approaches.

Figure 3:
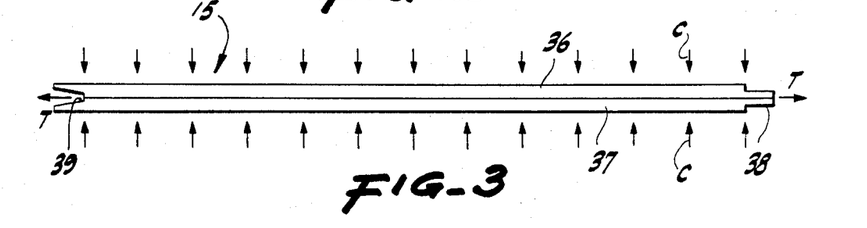
Figure 4:
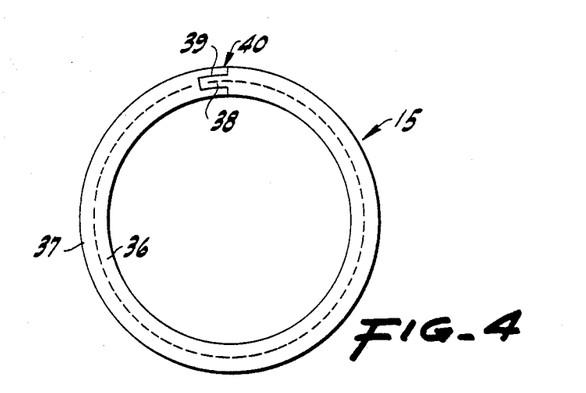
FIG. 4 is a transverse cross-section of a preferred embodiment of the laterally prestressed tubular belt of the present invention formed by the method of FIGS. 2 and 3.

FIG. 4 depicts the operational tubular configuration of a presently preferred embodiment 15 of my tubular belt. The belt 15 is constructed as a two-layer composite comprising an inner elastic layer 36 and an outer elastic layer 37. the longitudinal edges of the belt are fabricated, respectively, as a tongue 38 and as a mating groove 39. The sidewalls of the groove 39 are slightly wedged out (FIG. 3), so that when the belt is wound into its normally closed tubular configuration by the inner prestress forces, tongue 38 locks into groove 39. The inner prestress forces that wind the belt into the tubular configuration are made sufficiently strong during the fabrication process to normally bend the belt through $\geqq 360°$ so that the edges overlap. As a result, the belt edges at the joint are kept under compression and tightly closed during operation, including high speed loaded operation. The lateral stiffness of the tubular belt 15 is substantially equal in all radial directions.

Figure 2:
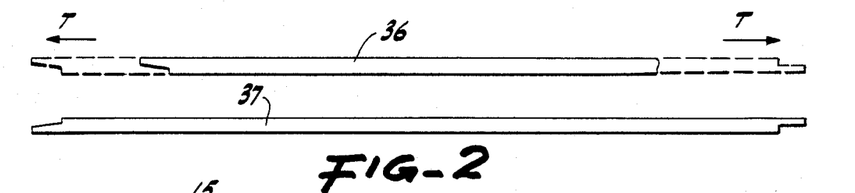
FIGS. 2 and 3 depict a construction for and method of prestressing and joining the tubular belt of the present invention.

FIGS. 2 and 3 illustrate schematically my presently preferred method of fabricating the two layer belt 15 of FIG. 2. As shown, the original width of the outer layer 37, before prestressing, is greater than the nominal width of the belt 15. The original unstressed width of the inner layer 36 is smaller than the belt width. Initially a prestressing tensile force T, uniformly distributed laterally over the entire length of inner layer 36, is applied to the edges of the inner layer, to stretch that layer laterally until its width coincides with that of the outer layer 37. This stretching is illustrated in phantom in FIG. 2. Next, the two layers 36 and 37 are joined together, as by applying pressure as indicated schematically by arrows C, and are joined together by gluing or welding to form the composite two-layered belt 15. See FIG. 3. Then, the tensile force T and the pressure C are removed, allowing the released belt to shrink to its normal tubular configuration shown in FIG. 4. This tubular configuration is created and maintained by internal bending moments, distributed over the entire lateral cross-section of the belt, which result from the reactive lateral tensile stress in the inner layer 36 and the reactive lateral compressive stress in the outer layer 37.

As one example, the layers 36 and 37 of the belt 15 can comprise an elastic material such as latex. To form the belt 15, the outer layer 37 is laid flat on the lower platen of a press. The inner layer 36 is stretched laterally by attaching vises to its outer edges and applying an outwardly directed tensile force T to stretch the inner layer so that it coincides in width to the outer layer 37. Adhesive such as barge cement is then applied to the facing side of one or both of the inner and outer layers. The layers are pressed together by the press with force C, and the tension T is maintained, until the adhesive dries. For inner and outer layers 36 and 37, 1.5 mm thick and 60–80 mm wide, exemplary values of the tensile force T and compressive force C are 0.35 kg/cm and 1.0 kg/cm², respectively.

Sufficient prestress forces for creating ending moments which wind the belt are incorporated into the belt 15 to maintain the edges of the belt locked under compressive force at the joint 40. This compressive force, $P_c$, is defined as $$P_c \geq P_i + O_r$$

where $P_i$ is the tensile force in a tube subjected to a maximum internal outward material pressure, accounting for material characteristis, such as density and angle of internal friction, and also for nominal inclinations of the conveying line and dynamic effects; and $P_r$ is the reopening force at conveyor turns.

This compressive force can be computed as a tangent force in a cylindrical membrane shell, subjected to global bending with a predefined curvature (equal to the nominal curvature of conveyor turns).

The compressive force acting at the joint formed by the two edges ensures a tight joint at any position along the belt and at any location along the conveyor line.

The above-described tubular construction is much more rigid in the vertical plane than an open belt. However, the lateral stiffness of the tubular belt is significantly lower than that of an open belt in the horizontal direction. This provides an opportunity to arrange the turns of the conveyor line in any direction with using relatively small radii turns.

Figure 5:
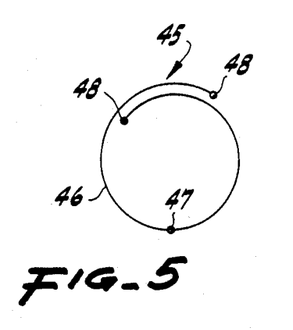
FIGS. 5 and 6 schematically depict transverse cross-section and side elevation views of reinforcement band means for the tubular belt of the present invention.
Figure 6:
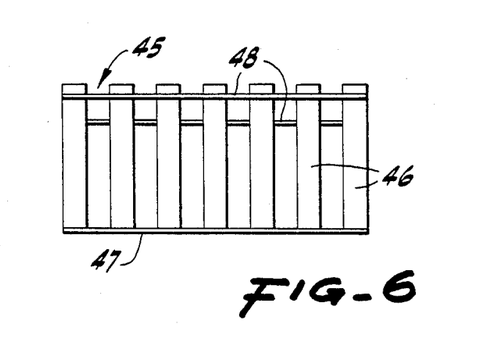

FIGS. 5 and 6 depict spring reinforcement means 45. The spring reinforcement assembly 45 can be joined to a single or multiple layered belt or between the layers of the belt during its fabrication. The reinforcement carcass typically comprises thin spring steel circumferential bands 46 whose springing effect causes them, when released, to bend to an angle greater than 360°. See the schematic configuration shown in FIG. 5. The bands 46—46 are connected to a central rib element or spine 47. The spine 47 resists tension, but its resistance to compression and bending and stiffness are essentially negligible. The reinforcing assembly 45 is completed by edge ribs 48 that are similar to the central rib or sping 47.

When the spring reinforcing assembly 45 is incorporated in belts such as 15, the tubular configuration of the prestressed belt can be provided by the spring assembly 45 alone, or by the spring assembly in conjunction with the prestressed composite belt construction of FIGS. 2 and 3. It should be noted that the reinforcing carcass or spring assembly 45 can be made of spring steel or of other strong flexible materials that possess "memory" as to their original shape. The spring reinforcement assembly is joined to the belt by lamination. For example, the reinforcing carcass can be positioned between the belt layers 36 and 37 and laminated to these layers during the assembly depicted in FIGS. 2 and 3.

For a conventional conveyor system using a flat belt, the idler rollers are spaced to limit the vertical deflection of the loaded branch of the belt. Due to the catenary response of the belt, the longitudinal tension in the flat belt reduces the deflections from the desired path of movement. In contrast, in a conveyor system using the tubular belt 15, the longitudinal tensile force is drastically reduced by the distributed drive scheme and is of essentially no significance. This removes the restrictions on the length of the conveyor belt. At the same time, the vertical stiffness of the tubular configuration is essential in that it alone, and not longitudinal tensile force, determines the distances between the support rollers which serve as the gravity support for the continuous tubular beam. As a result, when conveying distances are very long and the line is substantially horizontal, it is useful to make the belt more rigid in the vertical plane without increasing its horizontal lateral stiffness. This reduces the number of support rollers required while preserving the ability to incorporate horizontal turns and detours.

Figure 7:
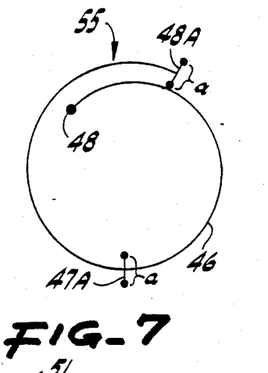
FIG. 7 schematically depicts a transverse cross-section view of alternative reinforcement band means that provides increased vertical stiffness.
Figure 8:
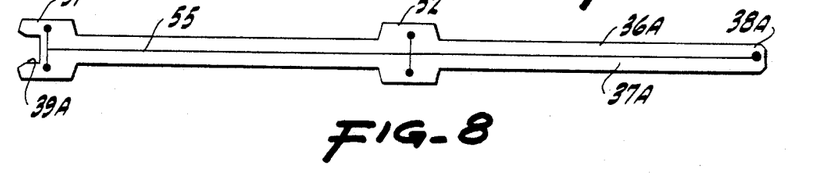
FIG. 8 is a transverse cross-section view of an embodiment of my tubular belt, shown laid out in a flat configuration, which can incorporate the reinforcement means of FIG. 7.
Figure 9:
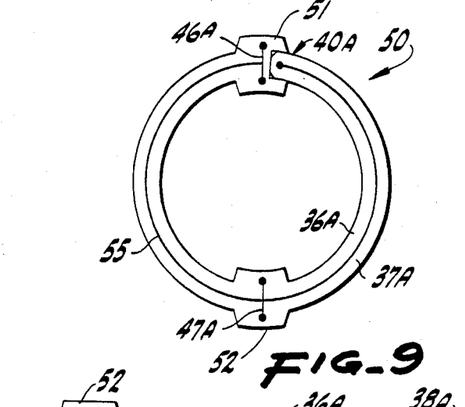
FIG. 9 is a transverse cross-section of the tubular belt of FIG. 8 shown in its normally closed carrying configuration.

FIGS. 7, 8 and 9 depict an alternative embodiment 50 of my tubular belt that has this desirable combination of horizontal flexibility and increased vertical rigidity or stiffness. The belt 50 includes relatively thick, longitudinal top and bottom stiffening pads or strips 51 and 52. For additional stiffness, and optionally, a spring biasing assembly 45, FIG. 6, or 55, FIG. 7, can be incorporated into the belt between the inner and outer belt layers 36A and 37A.

As shown in FIG. 7, the assembly 55 is an alternative embodiment of the assembly 45, shown in FIGS. 5 and 6, and incorporates a center rib element 47A and an edge rib element 48A in place of the ribs 47 and 48 used in the assembly 45. Each of the elements 47A and 48A preferably comprises a flexible mesh of metal or other suitable material, or a pair of (or several) longitudinally-extending flexible tubes, also of metal or other suitable material. The stiffening ribs 47A and 48A are mounted between the belt layers 36A and 37A with their long transverse side oriented vertically (that is, along the diameter of the desired direction of stiffening). This enhances the vertical stiffness while retaining horizontal flexibility. See FIGS. 7 and 9. Preferably, this inherent spring action of the assembly 45 is sufficient to bend the assembly (prior to mounting to the belt) through at least 360°, and preferably greater than 360°. As a consequence, when the spring assembly is mounted to/in the belt 50, the springing action urges the belt edges 38A and 39A to overlap. This provides secure locking of the belt edges at the joint 40A, FIG. 9, with the ribs 47A and 48A aligned along the desired diameter. Here, the desired diameter is vertical and the bands 46A and 47A provide increased vertical stiffness (and resistance to deformation), while retaining lateral flexibility and, thus, small radius turn characteristics.

Distributed Drive Method and System

Conventional flat belt endless conveyor systems drive the belt via one of two end pulleys, using friction between the belt and the drive pulley. Increasing the length of the conveyor lines increases the power and friction required to drive the conveyor belt. Friction can be increased by increasing the belt tension. However, high belt tensile forces not only require a heavily reinforced, expensive belt construction, but also limit the maximum length of even reinforced flat belt conveyors to several hundred yards. In addition, large diameter end pulley drums are required for long conveyor runs, both because of the need for a large friction surface and because the thick, heavily reinforced belts cannot be bent through small radius turns. Furthermore, for a given conveying speed, increasing the diameter of the pulley drum lowers the rotational speed of the pulley, which requires a higher transmission gear ratio and is less efficient.

My distributive drive and the drive components used in driving the tubular belt conveyor eliminate the above shortcomings.

Figure 10:
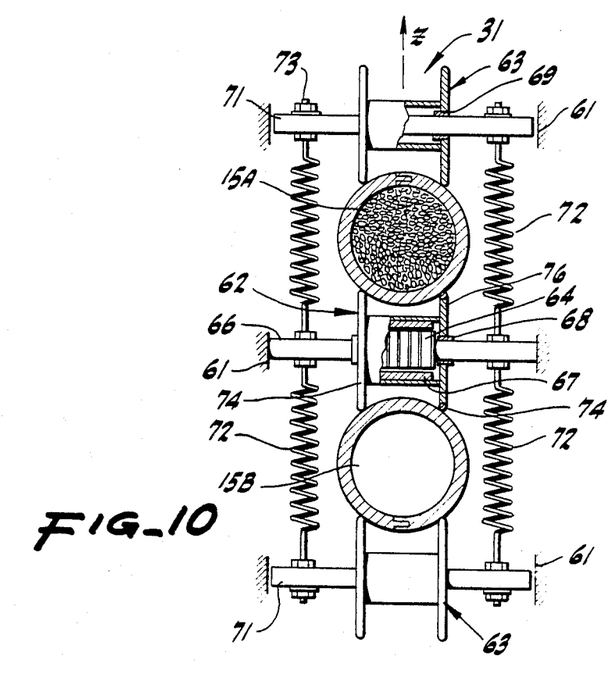
FIG. 10 is a transverse cross-section view of the tubular conveyor belt shown in FIG. 4, partly in schematic form, and showing a preferred embodiment of a drive roller for both branches of the belt.

One preferred embodiment 31 of the driving device of my invention is shown in FIG. 10. The driving device 31, i.e., drive roller system 31, is mounted to means 61 such as the conveyor framework or girders or associated building frame or girders. The driving device 31 comprises a drive idler 62, which is mounted between the loaded branch 15A and the empty branch 15B of the conveyor belt, and two satellite idlers 63-63, which are mounted on the opposite (outer) sides of the two conveyor branches.

The drive idler 62 comprises an electric motor which has its stator 64 fixed on a hollow shaft 66 which, in turn, is fixed to the framework 61. Rotor 67 is the coil of the electric motor and is rotatably mounted on the shaft 66 on bearings 68. The motor wiring (not shown) is conveniently routed along the inside of the hollow shaft 66.

The satellite idlers 63-63 are mounted for rotation on axles 71 by bearings 69. Preferably, each axle is mounted to the frame 61 and moves only up and down, in the z direction. For example, flanges (not shown) may be mounted at each end of the axle 71 at slots (not shown) formed in the frame 61 to position the axle for vertical movement along the slots. Preferably, each satellite idler at axle 71 is also connected to the fixed drive idler shaft 66 through a flexible bond. As shown in FIG. 10, in one embodiment, this flexible bond is provided by a pair of springs 72-72 which are mounted to and extend between the fixed hollow idler shaft 66 and the vertically movable satellite idler axle 71, one each on opposite sides of the conveyor branch and associated idlers. Tension in the springs can be controlled by tightening or loosening retaining nuts 73. The flexible bonds serve to press the conveyor branches 15A or 15B firmly against the drive idler 62 for driving the branches of the conveyor. In addition, rubber rings 74 can be mounted on the rims 76 of the drive idler rotor or barrel 67 to increase the friction between the rims of the drive idler barrel and the tube belts.

In operation, when the rotor 67 is rotated, the drive idler rims 76 engage and rotate the loaded and empty branches 15A and 15B to move the branches in opposite directions with equal velocities. The driving force depends upon the amount of friction generated between the barrel or rotor 67 and the belt branches 15A and 15B. This friction is directly proportional to the normal component of pressure at the contact surfaces. Therefore, the driving force can be controlled by tightening the flexible connection or bond provided by the spring elements 72. It will be readily appreciated that the flexible bond can be provided by elements such as pneumatic, hydraulic, or electromagnetic cylinders or devices. In addition, the drive system 31 can comprise more than one drive idler. On steeply descending slopes, the drive system 31 may be operated in the reverse regime, that is, it may be driven by the belt rather than vice versa, to generate electricity and partially recuperate the total energy consumption.

Figures 11, 12:
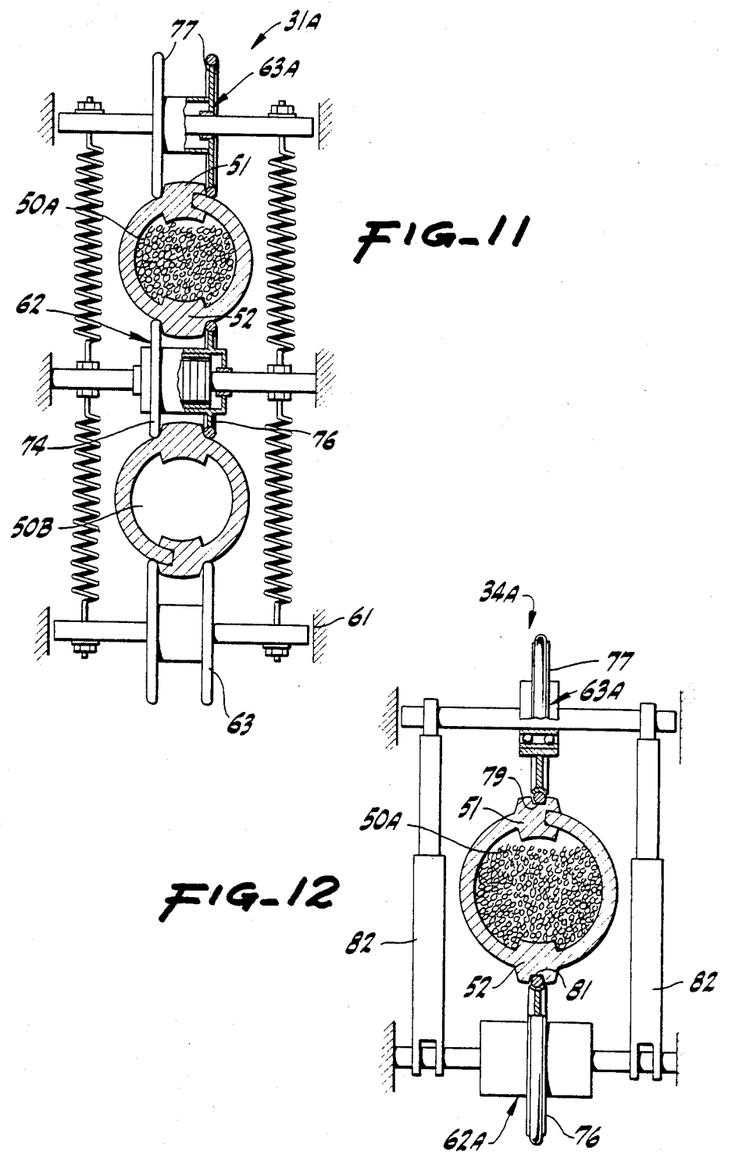
FIG. 11 is a transverse cross-section of the tubular conveyor belt shown in FIG. 9, partly in schematic form, and showing a drive roller for both branches of the belt.
FIG. 12 is a transverse cross-section, partly schematic, of a one-rim drive roller arrangement for the load branch of a tubular conveyor belt modified to include a longitudinal drive groove of the type shown in FIG. 9.

FIGS. 11 and 12 depict alternative embodiments 31A and 34A of the driving devices. Embodiment 31A, FIG. 11, utilizes the belt 50, FIGS. 7-9. The reinforcement pads 51 and 52 are positioned between the rims 76 of the drive idler 62 and between the rims 77 of the satellite idlers 63 to guide the tubular conveyor belt and prevent twisting of the load and return branches.

Load branch driving device 34A shown in FIG. 12 also utilizes the reinforced tubular belt 50 and utilizes the idler rims to guide the belt. In this embodiment, the drive idler 62A is formed with only a single rim 76, while the satellite idler 63A is also formed with a single rim 77. The rims 76 and 77 engage a pair of longitudinal grooves 79 and 81 formed in the reinforcement pads 51 and 52 to provide the guiding and twist-prevention functions. The flexible bond is provided by hydraulic jacks 82. Of course, the driving device 34A can be constructed as a two satellite idler device.

Feeder-Accelerator Tower

Conventional conveyor loading approaches are unsuitable for loading fast moving conveyor belts because of the tendency to destroy the belt and to scatter and destroy the material, as well as to only partially load the conveyor. My feeder 11 avoids such shortcomings and provides an efficient non-destructive approach for loading tubular belt conveyors moving at high speeds (conveying speeds of up to 40 mph and above). These qualities are achieved by conforming the material loading rate to the capacity of the moving conveyor and by converging the velocity vector of the loaded material with the velocity vector of the tubular belt at the loading belt opening 24, FIG. 1.

Figures 13, 14, 15:
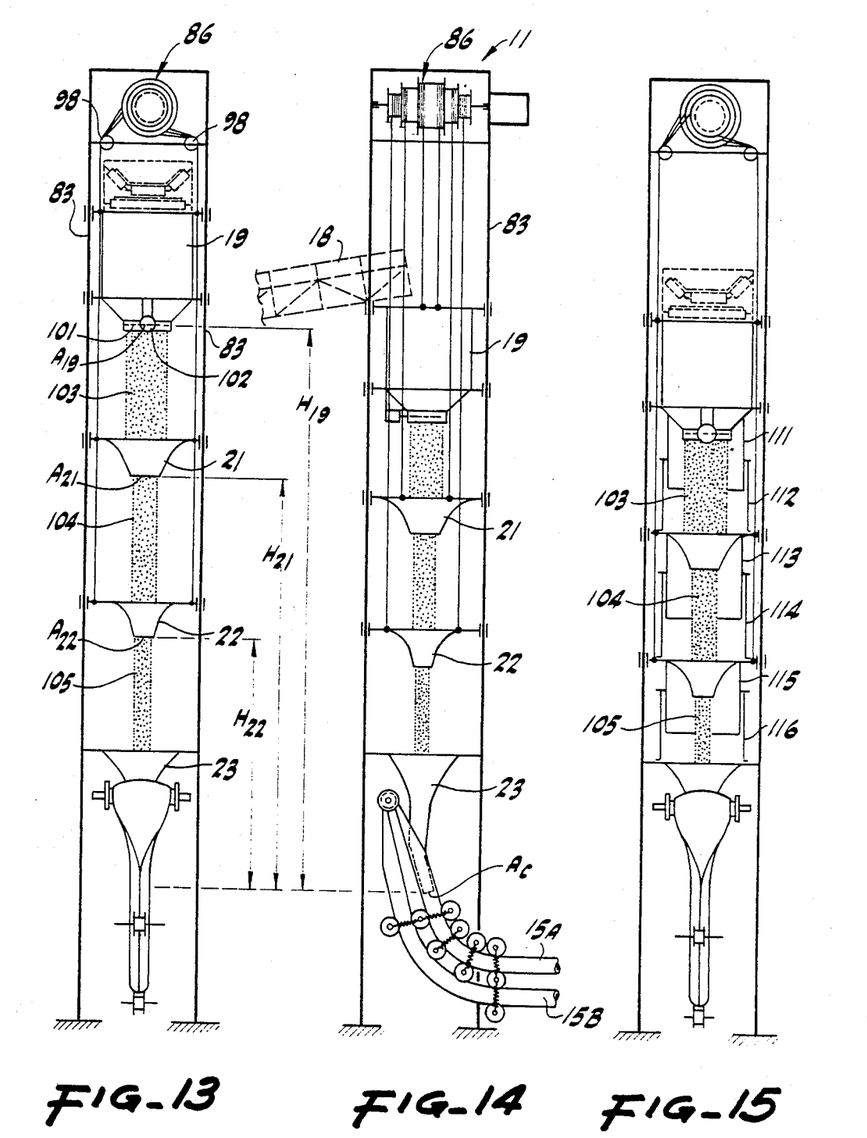
FIG. 13 is a front elevation view of the feeder-accelerator tower of FIG. 1, shown positioned for maximum productivity.
FIG. 14 is a side elevation view of the feeder-accelerator tower of FIG. 1, shown positioned for reduced productivity.
FIGS. 15 and 16 are front elevation views of alternative embodiments of the feeder-accelerator tower of the present invention, employing telescoping tube enclosures and hydraulic jacks, respectively.

Referring to FIGS. 1 and 13, the feeder-accelerator tower 11 (or, simply, feeder 11) comprises a support structure such as a tubular frame tower 83 on which bunker 19 and funnels 21 and 22 are slidably mounted for vertical movement. Funnel 23 is fixedly mounted on frame 83. The funnel 23 includes a curved sleeve 84 which fits into the load opening 24 formed in the conveyor belt 15 by the pulley 26. The funnel sleeve 84 is aligned with the direction of movement of the conveyor at the opening point to guide the material dispensed from the loader/transporter 18 in the direction of travel of the load branch 15A of the tubular conveyor belt.

The rate and velocity at which the material dispensed from the loader 18 is loaded onto the belt branch 15A is controlled by lifting device 86 which is mounted toward the top of the frame or tower 83. The lifting device 86 includes a number of pulleys which are rotatably mounted on an axle 87 which is driven reversibly by motor 88. Bunker 19 is suspended by cables 89 attached to pulley 91 for raising and lowering. Funnel 21 is similarly suspended by cables 92 about a pair of pulleys 93 and funnel 22 is supported by cables 96 mounted to pulleys 97. The radii/diameters of the pulleys or reels may be inversely proportional to the squares of the openings of the bunker and funnels to maintain the desired relationship between the heights of the bunker and funnels. The pulleys or reels 91, 93 and 97 are fixed on the shaft 87 of the lifting device. The cables supporting the main bunker 19 and the intermediate funnels 21 and 22 are guided by the pulleys 98 (FIG. 13) as they are reversibly wound onto and unwound from their corresponding pulleys 91, 93 and 97 to raise or lower the main bunker 19 and the intermediate funnels 21 and 22 along the guides on the frame 83.

The size $A_{19}$ of the discharge opening 99 in the bottom of the main bunker 19 is controlled by a conventional aperture plate 101 which is moved by drive means 102 such as an electric motor. The bunker 19 serves as an intermediate storage point to accumulate material dispensed from the transporter 18 for loading the conveyor belt, and perhaps more importantly, provides a smooth uniform flow of material at a rate (volume/time) which is controlled by the distributor plate 101 to match the capacity of the moving conveyor belt 15.

When the speed of the conveyor belt 15 is increased/decreased, the opening $A_{19}$ can be enlarged/decreased by the distributor 101 to maintain equality between the dispensing rate provided by the bunker 19 and the capacity of the moving conveyor belt 15. Thus, the volume of material flow dispensed via the opening $A_{19}$ and distributor plate 101 can be controlled to match the conveyor productivity, which is the working or cross-sectional area of the tube belt multiplied by the belt speed, $P_c = A_c V_c$. The speed of the conveyor is normally much higher than the speed of the gravity induced flow 103 of material dispensed from the opening $A_{19}$ of the bunker 19. See FIG. 13. Thus, the cross-section area $A_{19}$ of the opening 99 and the flow 103 must normally be larger than the cross-section of the tubular belt 15 in order to match the volume of material flow at the bunker to the capacity of the moving conveyor.

The height $H_{19}$ and the opening $A_{19}$ of the bunker 19 are chosen to match the productivity $P_c = A_c V_c$ of the tubular conveyor belt. Referring to FIGS. 1 and 13, the height $H_{19}$ of bunker 19 is $V_c^2/2g$. As a starting point, it is convenient to space the funnels 21 and 22 equidistant between the discharge openings of the fixed funnel 23 and the bunker. The bunker discharge opening $A_{19}$ is designed using conventional methods of defining the location of the zero velocity point, $h_o$, above this opening. The size of the bunker discharge opening is then $$A_{19} = P_c/(2gh_o) \qquad (1)$$

where g is the acceleration due to gravity.

The cross-sectional areas $A_{21}$ and $A_{22}$ of the discharge openings of the intermediate funnels 21 and 22 are selected so that these openings provide a smooth laminar flow of the dispensed, falling material and smoothly channel and compact the falling material to the opening cross-section $A_c$ of the lower, fixed funnel 23 and the conveyor belt at the pulley-induced opening 24. The selected productivity $P_c$ is to be maintained at each funnel 21 and 22. That is, $$P_c = A_c V_c' \qquad (2)$$
$$= A_{21} V_{21}' \qquad (3)$$
$$= A_{22} V_{22}' \qquad (4)$$

where $V_c$, $V_{21}$ and $V_{22}$ are the respective velocities of the material at the conveyor belt, the funnel 21 and the funnel 22.

Consider next the area $A_{21}$. Combining equations (2) and (3) gives $$V_{21} = P_c/A_{21} = A_c V_c/A_{21} = (2g(H_{19}-H_{21}))^{\frac{1}{2}}, \qquad (5)$$

or $$(A_c^2/A_{21}^2)V_c^2 = 2g(H_{19}-H_{21}), \qquad (6)$$

and $$H_{19} - H_{21} = (A_c^2/A_{21}^2 2g)V_c^2. \qquad (7)$$

Substituting $H_{19}$ for $V_c^2/2g$ in equation (7) gives $$H_{21} = H_{19}(1 - A_c^2/A_{21}^2), \qquad (8)$$

and $$A_{21} = ((H_{19}A_c^2)/(H_{19}-H_{21}))^{\frac{1}{2}}. \qquad (9)$$

Similarly,
$$A_{22} = ((H_{19}A_c^2)/(H_{19}-H_{21}))^{\frac{1}{2}}. \qquad (10)$$

Thus, the height $H_{19}$ and area $A_{19}$ of the bunker are selected as described above to load the material dispensed from the bunker onto the conveyor with a productivity which substantially equals the productivity of the conveyor at the given conveyor cross-sectional area $A_c$ and speed $V_c$. Also, the size $A_{21}$ and $A_{22}$ of the openings of the intermediate funnels are selected as described above to create a laminar flow of material of controlled decreasing size which approximates the shape and, thus, the funneling action of a hyperboloid of revolution of height $V_2/2g$ and circular cross-section areas $A_{19}$, $A_{21}$ and $A_{22}$ at the position of the bunker and intermediate funnel openings. The decreasing cross-sectional area of the flow of falling material is illustrated, for example, at 103, 104 and 105 in FIGS. 13 through 15.

It should be mentioned that it may be possible to eliminate the intermediate funnels for systems which use low loading speed and height. Furthermore, the invention is not limited to the use of two intermediate funnels to effect high speed productivity. One or more intermediate funnels can be used. Typically, however, increasing the number of intermediate funnels more closely approximates a continuous smooth hyperboloid funnel and thereby enhances laminar flow. Also, as the loading speed $V_{23}$ and the associated height $H_{19}$ are increased, it is advantageous to increase the number of intermediate funnels. At present, it is believed there is no fixed optimum number of intermediate funnels for a particular bunker height.

Referring to FIG. 13, the cross-section of the material flow 105 entering the funnel 23 is just slightly larger than the opening $A_{23}$ of this funnel 23, which is approximately equal to the cross-section of the conveyor belt 15A and, thus, matches the cross-section of the flow of loaded material to the conveyor belt. With the speed $V_{23}$ of the loaded material also being made approximately equal to the speed of the moving conveyor belt (by choosing the height $H_{19}$ of the bunker to be $V_c^2/2g$), the material is loaded onto the conveyor belt at a rate $A_{23}V_{23}$ which equals the productivity, $P_c = A_c V_c$, of the moving conveyor belt.

In addition, the curved sleeve 84 of the fixed loading funnel 23 is oriented parallel to the load branch of the belt at the opening 24 so that the velocity (direction and speed) of the loaded material corresponds to that of the conveyor belt. This facilitates smooth, efficient loading. In this regard, it should be mentioned that the orientation of the load section 15A of the belt is defined by the load pulley 26 and the assembly of drive rollers at load turn 12. The inclination of the conveyor belt can be varied by altering the position of the end load pulley and/or the drive means.

It should be noted that the sidewalls of the funnels 21, 22 and 23 have a curved profile which can be tailored to the type of bulk material and the nominal speed of the conveyor system. In general, it may be desirable to use a sidewall slope which is more steep for relatively high internal friction materials such as soil or coal than for low friction materials such as shelled corn.

The bunker 19 may be lowered during the start and stop mode of the conveyor to accommodate the reduced conveyor speed, as well as during relatively low productivity operation. In such cases, moving a fully loaded belt at a reduced speed is more efficient than running a partially loaded belt at higher or maximum speed. Thus, in the lower productivity modes, it is desirable to reduce the speed of the falling material inside the feeder 11. This means that the bunker 19 should be lowered, the material flow permitted by distributor plate 101 should be reduced, and the elevations of the funnels 21 and 22 should be lowered. In moving the bunker, the heights, H, of the discharge openings of the bunker 19 and the funnels 21, 22 preferably are controlled by the use of pulley diameters, $D_{91}$, $D_{93}$, $D_{97}$, which are inversely proportional to the squares of the cross-sectional areas of the discharge openings. That is, $D_{91}:D_{93}:D_{97}$ $\alpha(1/A_{19})^2:(1/A_{21})^2:(1/A_{22})^2$. Adjustment of the height of the bunker 19 to control the productivity then automatically adjusts the height of the funnels 21 and 22.

In the side and front elevation view shown in FIGS. 1 and 13, the main bunker 19 is at its maximum height in order to provide maximum gravitational acceleration and loading speed and, thus, maximum productivity. FIGS. 14 and 15 show the bunker at a lower height which provides correspondingly lower maximum productivity. The pulley diameters $D_{91}$, $D_{93}$, $D_{97}$ are selected as described above so that the intermediate funnels 21 and 22 with constant discharge areas are positioned at correspondingly lower elevations for the purpose of maintaining the capacity of the material flow at these elevations.

FIG. 15 depicts an insulating dust proof feeder construction which utilizes telescoping tubings 111 and 112, 113 and 114, and 115 and 116 to isolate the material flows 103, 104 and 105 from the surrounding environment inside the feeder tower. As shown, the upper tube (111, 113, 115) of each telescoping pair is mounted to the associated upper bunker or funnel, whereas the lower tube (112, 114, 116) of each pair is mounted to the funnel at the bottom of the pair so that the telescoping tubing pairs accommodate the variable distances between the bunker 19 and the funnels 21 and 22 and 23.

Figure 16:
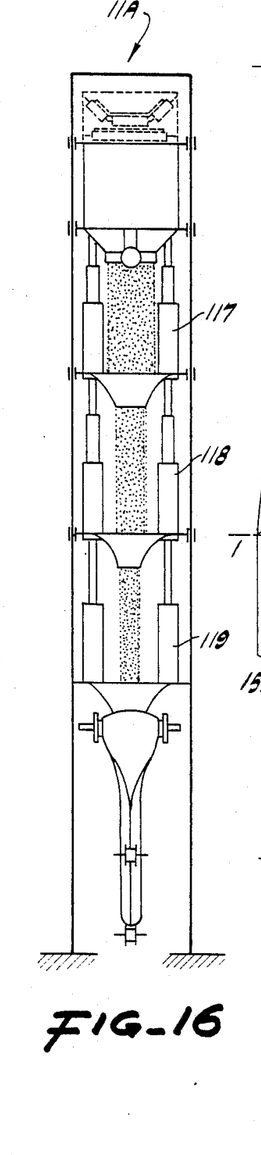

FIG. 16 shows an embodiment 11A of the feeder 11 in which the reel and cable lift system 86 is replaced by telescoping two-step and/or three-step hydraulic jacks 117, 118 and 119. The jacks are mounted on the intermediate floors of the feeder 11 which support the funnels 21, 22 and 23. The jacks 117, 118 and 119 can be controlled by a computer or by a hydraulic programmable device which is programmed to react to the changing speed of the conveyor line. This embodiment does not require a lift device 86 and, thus, may be shorter than the feeder 11 shown in FIG. 1 et al.

End Pulleys

As discussed relative to FIG. 1, the loading end pulley 26 and the unloading end pulley 27 are located at the opposite ends of the conveyor line for unwinding the tubular belt 15 for loading and unloading.

Figures 17, 18, 19:
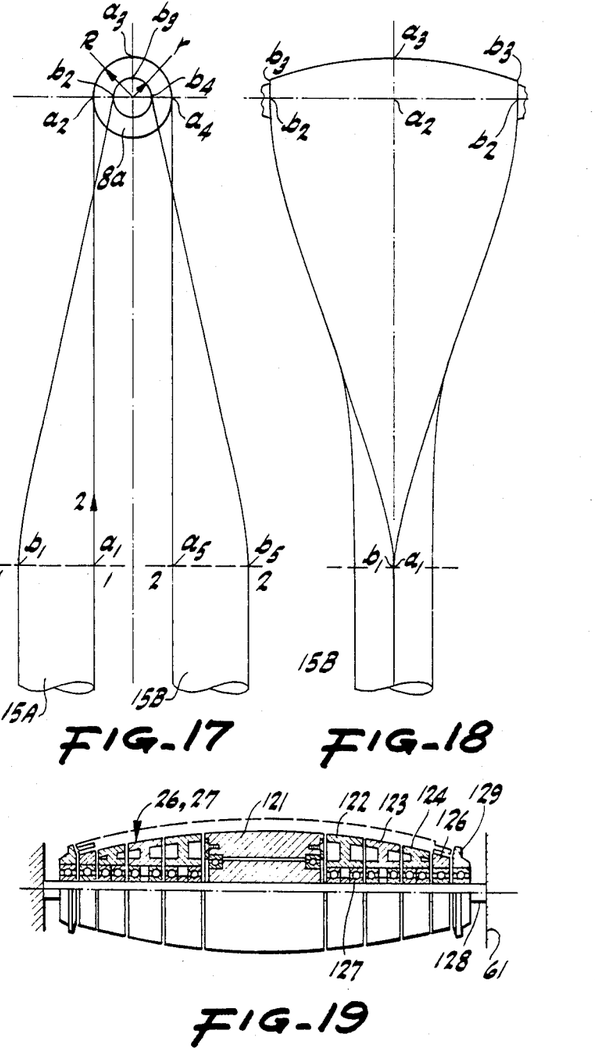
FIG. 17 is a schematic side view depicting a normally closed tubular conveyor belt passing over an end opening pulley for loading or unloading.
FIG. 18 is a plan view of the unwinding belt of FIG. 17.
FIG. 19 depicts the end pulley of FIGS. 17 and 18, shown partly in section for the purpose of illustrating the preferred segmented construction of the pulley.

In the present invention, the profile of each end pulley is shaped to control the path length traversed by the different sections of the belt around the circumference of the pulley. The purpose is to equalize the longitudinal tension in the belt as it passes over the end pulleys 26 or 27. The design used to implement this goal is illustrated in FIGS. 17 and 18, which schematically depict a side view (FIG. 17) and a plan view (FIG. 18) of the belt as it passes over the unloading end of pulley 27. The same principles apply to loading end pulley 26. As shown, starting at section 1-1, the loaded branch 15A is gradually unwound as it moves toward and over the pulley 27. After unloading the bulk material at the end of its pass, the empty branch 15B is gradually wound back by the internal prestress forces until the belt is returned to its normally closed tubular configuration at Section 2-2.

Two sets of points illustrate the characteristic fibers in the belt: points $a_1$, $a_2$, $a_3$, $a_4$ and $a_5$ are on the path traveled by a central section or fiber of the belt 15, whereas points $b_1$, $b_2$, $b_3$, $b_4$ and $b_5$ are on the path traveled by an edge section or fiber. Equalization of tension in the edge and central sections requires that the paths $a_1-a_2-a_3-a_4-a_5$ and $b_1-b_2-b_3-b_4-b_5$ be made equal. However, for a conventional cylindrical (flat) pulley, the distances $b_1-b_2$ and $b_4-b_5$ are greater than the corresponding distances $a_1-a_2$ and $a_4-a_5$ (the distance $a_2-a_3-a_4$ and $b_2-b_3-b_4$ are equal in a cylindrical pulley). It has been determined that, to substantially equalize stresses in the different sections of belt, the edge radius r of the pulley 27 ($b_2-b_3$) must be made smaller than the central radius R ($a_2-a_3$) so that the pulley surface $b_3-a_3-b_3$ approximates an arc as a circle of radius $a_1-a_3$ and center $a_1$. See FIG. 18.

FIG. 19 depicts an axial view of an end pulley 26 or 27, partly in section, which is constructed to substantially equalize stresses as discussed above and also to substantially equalize tension in the longitudinal belt fibers. The pulley 27 (or 26) comprises a plurality of segments 121–126, rotatably mounted on bearings 127 on an axle 128 which is mounted to the framework 61. Rims 129 restrict the belt from slipping off the roller and can be used as indicators for an electronic guiding system for correcting the lateral position of the belt. Radius r of edge roller segment 126 (measured from the axle), radius R of central roller segment 117, and the radii of the intermediate roller segments are selected so that the roller surfaces from circle arc $b_3-a_3-b_3$ of radius $a_1-a_3$ and center $a_1$ (FIG. 18) and the paths $a_1-a_2-a_3-a_4-a_5$ and $b_1-b_2-b_3-b_4-b_5$ are substantially equal. Thus, stress in the belt is substantially equal during operation.

In addition, each roller segment 121 through 126 rotates independently of the others so that the large segments toward the center rotate with lower angular velocity than the smaller edge segments.

Consequently, the associated sections of the belt traverse the pulley with substantially equal linear tangential velocities and, thus, equal longitudinal tension.

The end pulley construction shown in FIG. 19 could be incorporated into a drive roller, if additional drive is needed at the beginning or end of the conveyor, by driving the individual segments 121–126 with an angular velocity which is proportional to its circumference.

This could be done by applying a single drive through a set of gears on the axle 128 or by using separate drive for each of the segments 121-126.

EXAMPLE

Consider now the example of the design of a high speed conveyor belt system supplying fuel from a distribution stockpile to a 1 megawatt coal power plant. The following initial parameters are assumed:
Transportation distance—10 miles
Heating value of the fuel—9,500 Btu/lb
Heat rate of the fossil plant—10,500 Btu/kw-hr
Coal unit weight (size ≦ 1½")—50 lb/ft³
Fossil plant efficiency—50%.

Here, the power plant is assumed to be using one working tubular conveyor line 10 miles in length and one reserved line (100% reserved assumed). However, the high speed conveyor belt system can be employed over essentially unlimited distances, such as from coal fields in the western United States to a plant site, e.g., in Illinois. Also, a main belt system 10 can be used to feed smaller belt system 10 which convey the coal to individual power plants.

Based upon the above initial parameters, the required coal supply is 0.31 tons/sec. Assuming a conveyor belt speed of 20 meters/sec, or 44.7 mph, and that the tubular belt is filled to 85% of its capacity, the required throughput volume is 14.6 ft³/sec. Thus, the required inner diameter is 6.5", and the outside diameter $d_o$ of the completely closed tubular belt is 8.0". Prestress of the belt is achieved by straining the inner layer to 125% of its original width (5% losses assumed, so design prestrain is 20%). The prestressed belt is manufactured of two layers of a high elasticity latex (E=214 psi), with 12 steel ⅜"0 longitudinal wires, located in the midwall, designed to increase its stiffness as a continuous beam, supported by idlers. Bending stiffness of such a beam section is:

$$\Sigma EI = 28,100 \text{ kip-in}^2.$$

The self weight of the belt is:

$$KW_B = 8.76 \text{ lb/f.}$$

The weight of the coal load is:

$$KW_C = 9.45 \text{ lb/f.}$$

The distances between the idlers are determined based upon these weights, the above stiffness and allowable deflections. Allowable deflections are assumed to be 1/600 for a loaded branch and 1/300 for an empty one (1/100 allowable deflection is used for conventional conveyor lines). With these assumptions, distances between support idlers are $1_L=18.9$ feet for a loaded branch and $1_E=30.5$ feet for an empty branch. Acceptable nominal spans are $1_L=15$ feet and $1_E=30$ feet.

Based on maximum bending stress of its composite cross-section, the minimum allowable radius of conveyor line turns is $R_{min}=175'$.

The distributed drive is designed to fit three basic inclinations: (1) horizontal track sections; (2) 30° inclines; and (3) vertical track sections:

(1) Horizontal track. Assuming the coefficient of rolling friction $\mu=0.015$, the required compression between a tube and a roller is 123.7 kg(f) for a loaded and 119 kg(f) for an empty branch. The roller radius R=4"=10.2 cm. The resisting force $F_r$ is estimated then at 0.18 kg(f) per idler, and the torque T=1.85 kg(f)-cm. For a one mile long horizontal portion of a track, with 352 loaded branch idlers and 176 empty branch idlers, a total torque $\Sigma T=982$ kg(f)-cm is required.

At 1872 rpm, corresponding to the conveyor belt speed of 20 μ/sec, the total power required for all rollers is:

$$H = 18.88 \text{ kw/mi} \sim 20 \text{ kw/mi}.$$

(2) 30° incline. The self-weight of the loaded and empty branches act in opposite directions, so that only the coal weight should be considered. Note that for a coal angle of repose $\alpha=35°-45°$, no sliding of transported material inside the tubular belt is expected.

With the drive idlers spaced at 30 feet apart, the torque for one idler is 660 kg(f)-cm, which requires 12.7 kw power to drive per roller. Assuming then a power requirement of 13 kw per roller, the self-weight of loaded branch is not enough to mobilize all friction needed to produce such torque.

Additional compression can be achieved by pressing a satellite roller against the tubular belt with a force N=109 kg(f). This force can be accepted by a prestressed tubular belt without having it reopen (the safety factor, with dynamic amplification $kd_A=1.5$, is $k_s \sim 4.0$). On steeper slopes, the span between the drive idlers can be reduced as required.

(3) Vertical track (90° inclination). In this case, material fills the entire inner space of the tubular belt, creating additional inner pressure on its walls. However, this pressure is limited to a maximum value of:

$$P_{MAX} = \frac{\rho \gamma}{f_1} = \frac{(1.625)(50)}{(12)^3(0.55)} = 0.085 \text{ psi,}$$

where
ρ is the hydraulic radius, $$\rho = \frac{A}{\pi D} = \frac{D}{4} = 1.625'',$$

γ is the coal unit weight, and
$f_1$ is a coal-latex friction coefficient, 0.55.

Drive idlers, driven by the same 13 kw motor as chosen above, can each develop a pull-up force of 145 lbs. Then the maximum distance between drive idlers on a vertical portion of the track is $1_{max}=13.05$ feet. A nominal distance of 10 feet between drive idlers corresponds to a pull-up force of about 111 lbs. A compressive force N=370 lbs. is thus needed between an idler (and satellite) and the belt to pull up the conveyor line on a 90° vertical track. This provides a safety factor of ~3.0 for a tubular belt configuration.

From the above description and examples of the various presently preferred and alternative embodiments, those of usual skill in the art will readily derive, modifications of the present invention which are within the spirit and scope of the invention as defined by the claims.

What is claimed is:

1. A high speed transport system for pourable material, comprising:

an endless tubular conveyor belt having opposite longitudinal edges and being prestressed along the transverse width thereof to provide a normally closed tube configuration with the edges normally under compressive force against one another;

a distributed drive and support system comprising drive roller means mounted for engaging the tubular belt at spaced points along the length thereof for moving the belt along its length between selected load and unload positions, the endless belt comprising a load branch in that portion moving from the load position to the unload position;

a first, load pulley and a second, unload pulley, each said pulley supporting and opening the normally closed belt at the respective load or unload position; and a loader for loading material onto the moving conveyor belt at a rate and velocity conformed to the capacity and velocity of the belt and comprising: vertical frame means; an upper bunker mounted to the frame for gravity dispensing, the bunker having a dispensing opening of area selected for dispensing the material at a flow rate conformed to the capacity of the moving conveyor belt, and being located at a height above the conveyor for loading the material onto the conveyor at a speed approximating that of the belt; funnel means mounted between the bunker and the conveyor for directing the material flow through the load opening into the conveyor along a direction substantially corresponding to the direction of the conveyor movement; and means for varying the vertical positioning of the funnel means to conform the cross-section of the material flow to that of the conveyor.

2. The material transport system of claim 1 wherein the belt comprises elastic inner and outer layers joined together with the inner layer in tension along its width and the outer layer in compression along its width so that the resulting internal bending moments maintain the belt in a normally closed tubular configuration.

3. The material transport system of claim 1 wherein the belt further comprises spring biasing means mounted to or within the belt and a multiplicity of circumferential spring bands having inherent springing effect due to lateral prestress for maintaining a normally closed tubular belt configuration with the edges normally under compressive force against one another.

4. The material transport system of claim 1 wherein the belt includes reinforcing means for increasing the stiffness thereof along a selected diameter, comprising a pair of relatively thick longitudinally-extending belt sections on opposite sides of the belt at said diameter.

5. The material transport system of claim 1 wherein selected ones of said drive roller means comprise a roller mounted adjacent the load branch for rotatably engaging and driving said branch; an idler roller; and means adjustably mounting the idler roller on the opposite side of the load branch from the drive roller for controlling the force of engagement of said rollers with said load branch.

6. The material transport system of claim 1 wherein the endless conveyor belt is configured as adjacent load and return branches and wherein selected ones of said drive roller means comprise a roller positioned between the branches for rotatably engaging and driving the branches; first and second idler rollers; and means adjustably mounting the first and second idler rollers, respectively, on the load and return branches of the conveyor belt on opposite sides thereof from the drive roller for controlling the force of engagement of said rollers with the tubular belt.

7. The material transport system of claim 6 wherein the drive roller comprises a pair of spaced driving rims for driving the belt and the tubular belt comprises enlarged longitudinally-extending sections on opposite sides of said belt along a selected diameter adjacent to and between the drive rims for increasing the stiffness of the belt along said selected diameter to maintain the circumferential position of the belt relative to the drive rims.

8. The material transport system of claim 6 wherein, the drive roller comprises a drive rim; the belt comprises an enlarged longitudinally-extending section having a longitudinal groove therein for receiving the drive rim to thereby maintain the circumferential position of the belt relative to the drive rim; and whereby the roller and belt cooperatively maintain the circumferential position of the conveyor belt relative to the drive roller rim.

9. The material transport system of claim 1, wherein one or both of said load and unload pulleys is constructed with the ratio of the edge radius of the pulley being smaller than the center radius of the pulley substantially decreasing differences in the length of the paths traversed by the edge and center regions of the belt around the pulley to thereby substantially decrease stress differences in the belt edge and center regions; and wherein the pulley further comprises a plurality of independent rotating sections for adapting the angular velocity of the pulley to the tangential angular velocities of the belt along the pulley axis to thereby substantially decrease differences in the longitudinal tension along the belt.

10. The system of claim 4, said longitudinal belt sections extending both inwardly and outwardly of said belt.

11. The system of claim 4, 7 or 10 further comprising longitudinal spring ribs within said belt sections for selectively increasing the bending stiffness of the belt along the selected diameter.

12. A loader for loading granular-type material onto a moving conveyor belt at a rate and velocity conformed to the capacity and velocity of the conveyor belt, comprising:

vertical frame means;

an upper bunker mounted to said frame for holding a quantity of the material and having an opening in the bottom thereof for gravity dispensing of the material at a flow rate approximating the capacity of the moving conveyor belt, said opening being at a distance above the conveyor sufficient to provide a material speed at the conveyor approximating the speed of the conveyor;

a system of at least one intermediate funnel supported by the frame between the bunker and conveyor and in alignment with the path of the dispensed material flow;

means for varying the vertical positioning of the intermediate funnels at a predetermined ratio for channeling the flow by conforming the cross-section of the flow of the dispensed fluid to the cross-section of the conveyor; and a lower funnel supported by the frame between the system of intermediate funnels and the conveyor and aligned with the direction of movement of the conveyor for loading the material into the conveyor and for conforming the direction of the material flow to the direction of the conveyor movement.

13. The loader of claim 12, further comprising closure means associated with the upper bunker opening for varying the size of the opening to vary the dispensing flow rate according to the capacity of the moving conveyor belt.

* * * * *

UNITED STATES PATENT AND TRADEMARK OFFICE
CERTIFICATE OF CORRECTION

PATENT NO. : 4,823,941

DATED : April 25, 1989

INVENTOR(S) : Alex Mindich

It is certified that error appears in the above—identified patent and that said Letters Patent is hereby corrected as shown below:

IN THE SPECIFICATION

In Col. 2, line 45, change "electric" to --elastic--;

In Col. 4, line 66, change "bunder" to --bunker--;

In Col. 7, line 22, in the equation, change "$O_n$" to --$P_r$--;

In Col. 7, line 56, change "sping" to --spine--; and

In Col. 11, line 56, formula (2), change " $A_c\ V_c'$ " to --$A_c\ V_c,$--, i.e., change the prime symbol to a comma;

In Col. 11, line 57, formula (3), change " $A_{21}\ V_{21}'$ " to --$A_{21}\ V_{21},$--, i.e., change the prime symbol to a comma; and

UNITED STATES PATENT AND TRADEMARK OFFICE
CERTIFICATE OF CORRECTION

PATENT NO. : 4,823,941
DATED : April 25, 1989
INVENTOR(S) : Alex Mindich

It is certified that error appears in the above-identified patent and that said Letters Patent is hereby corrected as shown below:

In col. 11, line 58, formula (4), change "$A_{22}V_{22}'$" to --$A_{22} \ V_{22},$--, i.e., change the prime symbol to a comma.

Signed and Sealed this

Twenty-fifth Day of September, 1990

Attest:

HARRY F. MANBECK, JR.

*Attesting Officer*     *Commissioner of Patents and Trademarks*